Patented Sept. 22, 1942

2,296,377

UNITED STATES PATENT OFFICE 2,296,377

THERAPEUTIC COMPOUND

Robert D. Barnard, Chicago, Ill., assignor to Armour and Company, Chicago, Ill., a corporation of Illinois No Drawing. Application February 14, 1940, Serial No. 318,863

9 Claims. (Cl. 260—113)

This invention is concerned with new metal derivatives of ferrihemoglobin which have bactericidal properties and are of value in the treatment of infections. These compounds are advantageously used in treating various pathological conditions of the mucous membrane such as may occur in common colds; they may also be used in the treatment of other infections, such as bladder infections. The invention further deals with novel processes by which these compounds are prepared.

It has long been known that certain metals, such as silver, mercury, copper, gold and zinc possess germicidal properties. The metals themselves have sometimes been employed in the past. Silver, for example has been used as colloidal silver and mercury in a mixture known as "mercury with chalk." However, the pure metals are very irritating or even toxic and various investigators have developed a great many many compounds or mixtures which are intended to make available the beneficial properties of the metals and at the same time to avoid their irritant or too drastic action.

Among the silver compounds which have been used heretofore there are a number of compounds of silver with proteinaceous substances and these are commonly considered more satisfactory than the inorganic salts of silver. Argyrol is perhaps the best known of these compounds and is believed to be colloidal silver oxide with the protein acting as a colloid protective. This material is widely used, for example in treating rhinitis, conjunctivitis and urethritis, but is subject to the disadvantage that upon standing in solution for a time it becomes irritating to the body tissues. Other compounds, such as albargin (silver gelatose), contain the silver in an ionic form but in solution require storage in the absence of light. Compounds of mercury with proteinaceous materials have not been in wide use although a mercurialized serum is known which is prepared by simply precipitating serum with mercuric chloride. This is used for injection. Copper has been used therapeutically as copper citrate and copper nucleinate and the use of gold compounds in therapy is well known, as are also the antiseptic properties of cadmium and zinc compounds.

The above mentioned compounds, while of value in treating certain infections, are not stable upon standing in the presence of moisture and exposure to light. They either are irritating in themselves or develop irritant properties upon such storage. Gold compounds, while actively germicidal, are frequently unstable even in the dry state.

I have now discovered a new class of compounds which are stable and which are bactericides useful as therapeutic agents in treating such conditions as angular (Morax-Axenfeld bacillus) conjunctivitis, tonsilitis, and like disturbances. The substances are compounds of ferrihomeglobin with the heavy metals of the sub-groups B of groups I and II of the periodic system, including copper, silver, gold, zinc, cadmium and mercury. Ferrihemoglobin is hemoglobin in which the iron is present in the heme complex in the trivalent, or ferric, form. The compound is also known as Methemoglobin.

An advantage of my compounds is that they are markedly more stable than other compounds of these metals with proteinaceous materials which have been known heretofore. They may be kept for eight months or more and may be held in ordinary clear glass bottles or containers. They are, furthermore, stable toward physiological salt solution, blood serum or urine. They prevent the putrefaction of urine in concentrations of 1 to 2000.

Another advantage of my compounds is that they are non-irritant and, being stable, do not develop irritant properties upon standing.

My compounds may be obtained by the reaction of ferrihemoglobin with salts or other compounds of the heavy metals of the subgroups B of groups I and II of the periodic system. In the case of silver, the compound may be obtained by the reaction of ferrihemoglobin with the metal itself. Although the soluble and reduced compounds of the metals will react with ferrihemoglobin to give the metal ferrihemoglobins, I have discovered that the reaction goes more smoothly when the ferrihemoglobin is treated with water-insoluble compounds of the metals, or the compounds of the oxidized form of the metals.

A true reaction takes place between the ferrihemoglobin and the metal ion, as is demonstrated by the spectroscopic examination of the resulting compounds. To the ferrihemoglobin molecule there apparently have been added a number of metal ions and it is evident that the ion adds on at the prosthetic group of the hemoglobin radical. This may be demonstrated spectroscopically although I do not know the exact chemical composition of my new compounds. The solutions of these new compounds are characteristically bright scarlet in color, somewhat lighter than solutions of alkaline ferrihemoglobin.

The ferrihemoglobin solution employed in the preparation of my new compounds may be prepared in any convenient way such as by the method used in the following specific example:

*Example*

575 cc. of beef corpuscles are laked, that is, the hemoglobin is separated from the corpuscular stroma by the addition of 1500 cc. of a 0.25% solution of $K_3Fe(CN)_6$; and 250 cc. of toluene are added to the mixture. The whole is shaken for about 15 minutes and then transferred to a cold room at about 34° F. for 48 hours. After this time the toluene and the corpuscular stroma will have risen to the top and the ferrihemoglobin solution is siphoned off. The ferrihemoglobin so obtained is about 5 millimolar, calculated in terms of iron.

The compounds of my invention are now conveniently prepared by reacting ferrihemoglobin such as obtained in the foregoing example with suitable compounds of copper, silver, gold, zinc, cadmium and mercury such as silver chloride, silver acetylide, silver carbonate, mercuric oxide, mercuric acetylide, cupric hydroxide, cupric acetylide, gold chloride, such as auric chloride, gold hydroxide, such as aurous hydroxide and auric hydroxide, zinc oxide and cadmium hydroxide and the like. Following are some examples of such preparations:

*Example 1*

0.3 part by weight of silver bromide is added to 10 parts by weight of ferrihemoglobin solution in a pyrex vessel and the mixture is shaken periodically for about twelve hours. The resulting solution is a bright scarlet color and the silver ferrihemoglobin is 5 millimolar, calculated in terms of iron. The silver content of this reaction product shows that there is one molecular equivalent of silver to one of ferric iron in the compound.

The ferrihemoglobin may also be reacted with metallic silver and the end-product of the reaction will be the same, spectroscopically, in physical appearance and in effectiveness.

*Example 2*

0.5 part by weight of red mercuric oxide is added to 10 parts by weight of a 5 millimolar solution of ferrihemoglobin and the mixture allowed to react with shaking until a gelatinous mass is formed. The excess mercuric oxide is separated off and the scarlet jelly remaining is the desired compound. It is soluble in water and has a pH of 6.9.

*Example 3*

0.5 part by weight of cupric acetylide is added to 10 parts by weight of a 5 millimolar solution of ferrihemoglobin and the mixture is allowed to react with occasional shaking. The resulting solution has a bright scarlet color.

*Example 4*

0.1 part by weight of gold chloride is added to 10 parts by weight of a 5 millimolar solution of ferrihemoglobin and the gold ferrihemoglobin forms immediately, exhibiting the characteristic bright scarlet color. The compound is bacteriostatic and fungostatic.

The pigments obtained may be evaporated to dryness and thereupon yield red, solid residues which may be easily redissolved in water or suitable aqueous mixtures to give solutions having the same characteristics as the original solutions had prior to drying. The pigments show no alteration in color or solubility on admixture with physiological salt solution, blood serum or urine. The color of solutions of these compounds is pleasing and will not be confused with iodine by the user.

The metal ferrihemoglobins described above are odorless in solution and have a faintly metallic taste. They produce no stinging sensation upon application to the nose, throat, urethra or conjunctival sac of the human. When instilled into the eyes of rats hourly for twelve hours, no astringency was evidenced and when instilled into the human bladder, there was no evidence of irritation and the effect was, in fact, salubrious.

In the appended claims when I refer to heavy metals of sub-groups B of groups I and II of the periodic system of elements I include gold, copper, silver, mercury, cadmium and zinc.

Having now described my invention, what I wish to claim is:

1. A metal ferrihemoglobin containing a combined metallic ion derived from a metal chosen from the group consisting of copper, silver, gold, zinc, cadmium and mercury.

2. Silver ferrihemoglobin.

3. Mercury ferrihemoglobin.

4. Gold ferrihemoglobin.

5. A process for preparing derivatives of ferrihemoglobin which comprises reacting ferrihemoglobin with a water-insoluble salt of a metal chosen from the group consisting of copper, silver, gold, zinc, cadmium and mercury.

6. A process for the preparation of silver ferrihemoglobin which comprises reacting ferrihemoglobin with silver.

7. A process for the preparation of gold ferrihemoglobin which comprises reacting ferrihemoglobin with gold oxide.

8. A process for the preparation of gold hemoglobin which comprises reacting ferrihemoglobin with auric chloride.

9. A process for the preparation of mercury ferrihemoglobin which comprises reacting ferrihemoglobin with a water-insoluble mercurous salt.

ROBERT D. BARNARD.